(12) United States Patent
Childe et al.

(10) Patent No.: US 8,864,460 B2
(45) Date of Patent: Oct. 21, 2014

(54) BEARING ASSEMBLY

(75) Inventors: Matthew John Childe, Malmesbury (GB); Geoffrey Michael Burlington, Malmesbury (GB); David Michael Jones, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 131 days.

(21) Appl. No.: 13/589,947

(22) Filed: Aug. 20, 2012

(65) Prior Publication Data

US 2013/0223997 A1    Aug. 29, 2013

(30) Foreign Application Priority Data

Aug. 26, 2011    (GB) .................................. 1114787.3

(51) Int. Cl.
| | |
|---|---|
| *F04D 29/04* | (2006.01) |
| *F16C 35/06* | (2006.01) |
| *F16C 27/06* | (2006.01) |
| *F16C 35/077* | (2006.01) |
| *F16C 19/54* | (2006.01) |
| *F16C 25/08* | (2006.01) |

(52) U.S. Cl.
CPC ............... *F16C 35/06* (2013.01); *F16C 27/066* (2013.01); *F16C 35/077* (2013.01); *F16C 19/548* (2013.01); *F16C 25/083* (2013.01); *F16C 19/54* (2013.01); *F16C 2360/44* (2013.01)
USPC ...................................... 415/229; 415/170.1

(58) Field of Classification Search
USPC ........ 415/104, 107, 142, 170.1, 174.1, 172.1, 415/229, 230, 231; 384/518; 417/424.1, 417/424.2
See application file for complete search history.

(56) References Cited

U.S. PATENT DOCUMENTS

| | | |
|---|---|---|
| 2,107,090 A | 2/1938 | Swennes |
| 2,113,167 A | 4/1938 | Baumheckel |
| 2,235,763 A | 3/1941 | Horton |
| 2,908,536 A | 10/1959 | Dickey |
| 2,911,138 A | 11/1959 | Birmann |
| 2,939,626 A | 6/1960 | Birmann |
| 2,940,658 A | 6/1960 | Birmann |
| 3,068,638 A | 12/1962 | Birmann |
| 3,759,592 A | 9/1973 | Carlson |

(Continued)

FOREIGN PATENT DOCUMENTS

| | | |
|---|---|---|
| DE | 10221443 | 12/2003 |
| EP | 1025792 | 8/2000 |

(Continued)

OTHER PUBLICATIONS

Jones et al., U.S. Office Action mailed Oct. 8, 2013, directed to U.S. Appl. No. 12/709,880; 25 pages.

(Continued)

*Primary Examiner* — Edward Look
*Assistant Examiner* — Maxime Adjagbe
(74) *Attorney, Agent, or Firm* — Morrison & Foerster LLP

(57) ABSTRACT

A bearing assembly that includes a first bearing, a second bearing, a spring and a sleeve. The spring applies a preload to each of the bearings, and the sleeve surrounds the spring and the bearings. The sleeve includes an end portion that extends axially beyond the first bearing. The end portion includes a step down in the outer diameter that defines a seat for an o-ring.

14 Claims, 2 Drawing Sheets

(56) References Cited

U.S. PATENT DOCUMENTS

| | | |
|---|---|---|
| 4,147,470 A | 4/1979 | Brooks et al. |
| 4,426,089 A | 1/1984 | Takenaka et al. |
| 4,514,140 A | 4/1985 | Knopf |
| 4,652,219 A | 3/1987 | McEachern, Jr. et al. |
| 4,806,075 A | 2/1989 | Osterstrom et al. |
| 4,907,897 A | 3/1990 | Shirotori |
| 5,069,603 A | 12/1991 | Schuetz et al. |
| 5,163,811 A | 11/1992 | Okada |
| 5,289,067 A | 2/1994 | Tanaka et al. |
| 5,961,222 A | 10/1999 | Yabe et al. |
| 6,271,612 B1 | 8/2001 | Tanaka et al. |
| 6,368,081 B1 | 4/2002 | Matsumoto |
| 6,547,538 B1 | 4/2003 | Tamura et al. |
| 6,717,308 B2 | 4/2004 | Chen et al. |
| 7,077,626 B2 | 7/2006 | Bosen |
| 7,125,172 B2 * | 10/2006 | Ostling et al. ............. 384/537 |
| 7,384,247 B2 | 6/2008 | Anderson |
| 7,416,344 B2 | 8/2008 | Yamamoto et al. |
| 2004/0200215 A1 | 10/2004 | Woollenweber et al. |
| 2005/0207919 A1 | 9/2005 | Anderson |
| 2006/0023981 A1 | 2/2006 | Okayama |
| 2006/0131973 A1 | 6/2006 | Chiu et al. |
| 2008/0087018 A1 | 4/2008 | Woollenweber |
| 2008/0304986 A1 | 12/2008 | Kenyon et al. |
| 2009/0081040 A1 | 3/2009 | Ueno et al. |
| 2010/0148600 A1 | 6/2010 | Bauer et al. |
| 2010/0215491 A1 | 8/2010 | Mockridge et al. |
| 2010/0215500 A1 | 8/2010 | Jones et al. |

FOREIGN PATENT DOCUMENTS

| | | |
|---|---|---|
| EP | 1557578 | 7/2005 |
| FR | 2207247 | 6/1974 |
| FR | 2393175 | 12/1978 |
| FR | 2483024 | 11/1981 |
| FR | 2569771 | 3/1986 |
| GB | 788378 | 1/1958 |
| GB | 1305166 | 1/1973 |
| GB | 2175957 | 12/1986 |
| GB | 2406146 | 3/2005 |
| GB | 2442475 | 4/2008 |
| JP | 59-97557 | 7/1984 |
| JP | 62-117297 | 7/1987 |
| JP | 63-9428 | 1/1988 |
| JP | 1-242024 | 9/1989 |
| JP | 3-85394 | 4/1991 |
| JP | 4-3120 | 1/1992 |
| JP | 5-87290 | 11/1993 |
| JP | 6-66318 | 3/1994 |
| JP | 2000-208078 | 7/2000 |
| JP | 2001-73948 | 3/2001 |
| JP | 2001-303964 | 10/2001 |
| JP | 2002-31133 | 1/2002 |
| JP | 2003-97576 | 4/2003 |
| JP | 2004-278538 | 10/2004 |
| JP | 2004-316505 | 11/2004 |
| JP | 2007-506053 | 3/2007 |
| JP | 2008-92629 | 4/2008 |
| JP | 2008-144724 | 6/2008 |
| JP | 2009-79628 | 4/2009 |
| JP | 2011-106338 | 6/2011 |
| WO | WO-03/027523 | 4/2003 |
| WO | WO-2007/021838 | 2/2007 |
| WO | WO-2008/026876 | 3/2008 |

OTHER PUBLICATIONS

Search Report dated Dec. 19, 2011, directed to counterpart GB Application No. 1111 4787.3.

Mockridge et al., U.S. Office Action mailed Feb. 26, 2013, directed to U.S. Appl. No. 12/707,504; 12 pages.

Mockridge et al., U.S. Office Action mailed Jun. 25, 2013, directed to U.S. Appl. No. 12/707,504; 8 pages.

European Search Report dated Nov. 22, 2012, directed to counterpart EP Application No. 12 18 1313; 6 pages.

Jones et al., U.S. Office Action mailed Nov. 8, 2012, directed to U.S. Appl. No. 12/709,880; 13 pages.

Mockridge et al., U.S. Office Action mailed Nov. 7, 2013, directed to U.S. Appl. No. 12/707,504; 9 pages.

Jones et al., U.S. Office Action mailed Apr. 12, 2013, directed to U.S. Appl. No. 12/709,880; 13 pages.

Muszynska, Agnieszka. Rotordynamics. Boca Raton: Taylor & Francis, 2005. Print. p. 460.

Mockridge et al., U.S. Office Action mailed Sep. 13, 2012, directed to U.S. Appl. No. 12/707,504; 14 pages.

Jones et al., U.S. Office Action mailed Apr. 29, 2014, directed to U.S. Appl. No. 12/709,880; 26 pages.

* cited by examiner

BEARING ASSEMBLY

REFERENCE TO RELATED APPLICATIONS

This application claims the priority of United Kingdom Application No. 1114787.3, filed Aug. 26, 2011, the entire contents of which are incorporated herein by reference.

FIELD OF THE INVENTION

The present invention relates to a bearing assembly for a turbomachine.

BACKGROUND OF THE INVENTION

The rotor assembly of a turbomachine may include a bearing assembly that is soft-mounted to a frame by an o-ring. The o-ring may be seated in a groove formed around the bearing assembly. Since the o-ring is formed of an incompressible material, it is generally difficult to mount the rotor assembly to the frame. Additionally, although the mounting may provide good absorption of radial loads, the mounting is generally poor at absorbing axial loads.

SUMMARY OF THE INVENTION

In a first aspect, the present invention provides a bearing assembly comprising a first bearing, a second bearing, a spring applying a preload to each of the bearings, and a sleeve surrounding the spring and the bearings, wherein the sleeve comprises an end portion that extends axially beyond the first bearing, the end portion comprising a step down in outer diameter that defines a seat for an o-ring.

By providing an o-ring seat at an end of the bearing assembly, mounting the bearing assembly within a frame is made relatively easy. In particular, the bearing assembly can be inserted axially such that the o-ring pushes against a similar seat in the frame.

Providing an o-ring seat at an end of the bearing assembly has the further advantage that axial forces may be better opposed. In particular, the seats in the sleeve and the frame may extend around the o-ring such that axial displacement of the bearing assembly relative to the frame acts to compress the o-ring.

The sleeve may be adhered to the first bearing or the sleeve may form a clearance fit with the first bearing. This then has the advantage that the first bearing is able to move relative to the sleeve should the first bearing be subject to an axial force. The first bearing may comprise an inner race and an outer race, and the axial force may cause the inner race to move relative to the outer race. Since the sleeve is adhered or forms a clearance fit with the first bearing, the outer race is free to move relative to the sleeve. Consequently, in response to the movement of the inner race, the spring is able to displace the outer race relative to the sleeve so as to maintain the preload of the first bearing. When the sleeve is adhered to the first bearing, the elasticity of the adhesive join is sufficient to permit the first bearing to move relative to the sleeve in response to the axial force.

The end portion of the sleeve may comprise a step down in the inner diameter that is spaced axially from the first bearing. As a result, the o-ring seat may be formed using a thinner sleeve. Additionally, the bearing assembly may be mounted to the frame in more radially compact manner. Consequently, any axial displacement of the first bearing relative to the sleeve is not prevented by the step. To this end, the end portion may comprise a first portion proximal to the first bearing and a second portion distal to the first bearing. The inner diameter of the first portion is then greater than the outer diameter of the first bearing, and the inner diameter of the second portion is smaller than the outer diameter of the first bearing. The first portion therefore acts to space axially the step from the first bearing.

The sleeve may be secured to the second bearing by an adhesive. This then simplifies the manufacture of the bearing assembly.

In a second aspect, the present invention provides a rotor assembly comprising a shaft and a bearing assembly, wherein the bearing assembly comprises a first bearing, a second bearing, a spring and a sleeve, the spring applies a preload to each of the bearings, the sleeve surrounds the spring and the bearings, the sleeve comprises an end portion that extends axially beyond the first bearing, the end portion comprising a step down in outer diameter that defines a seat for an o-ring, and the shaft forms an interference fit with each of the bearings.

The rotor assembly may comprise an impeller mounted to the shaft, the impeller generating in use an axial thrust in a direction from the second bearing to the first bearing. By locating the o-ring seat at an end of the bearing assembly beyond the first bearing, the o-ring is able to oppose the axial thrust generated by the impeller.

The shaft may comprise a stepped section and each of the bearings may abut the stepped section such that the bearings are spaced by a predetermined distance. Since the bearings are spaced by a predetermined distance, better control over the preload of bearings may be achieved. In particular, by employing a spring having a predetermined spring constant, each of the bearings may be preloaded with the same predetermined force.

In a third aspect, the present invention provides a turbomachine comprising a frame and a rotor assembly, wherein the rotor assembly comprises a shaft and a bearing assembly, the bearing assembly is mounted to the shaft and comprises a first bearing, a second bearing, a spring and a sleeve, the spring applies a preload to each of the bearings, the sleeve surrounds the spring and the bearings, the sleeve comprises an end portion that extends axially beyond the first bearing, the end portion comprising a step down in outer diameter that defines a seat for an o-ring, and the rotor assembly is mounted to the frame by an o-ring located in the seat of the sleeve.

The rotor assembly may comprise an impeller mounted to the shaft, the impeller generating in use an axial thrust in a direction from the second bearing to the first bearing, and the first bearing moves relative to the sleeve in response to the axial thrust. By moving relative to the sleeve, the preload of the first bearing may be maintained and thus skidding of the first bearing may be avoided.

The bearing assembly may project axially into a region bounded by the top and bottom of the impeller. As a result, a shorter and stiffer rotor assembly is achieved. Additionally, radial loading of the bearings is reduced owing to the shorter cantilever length between the impeller and the bearing assembly.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
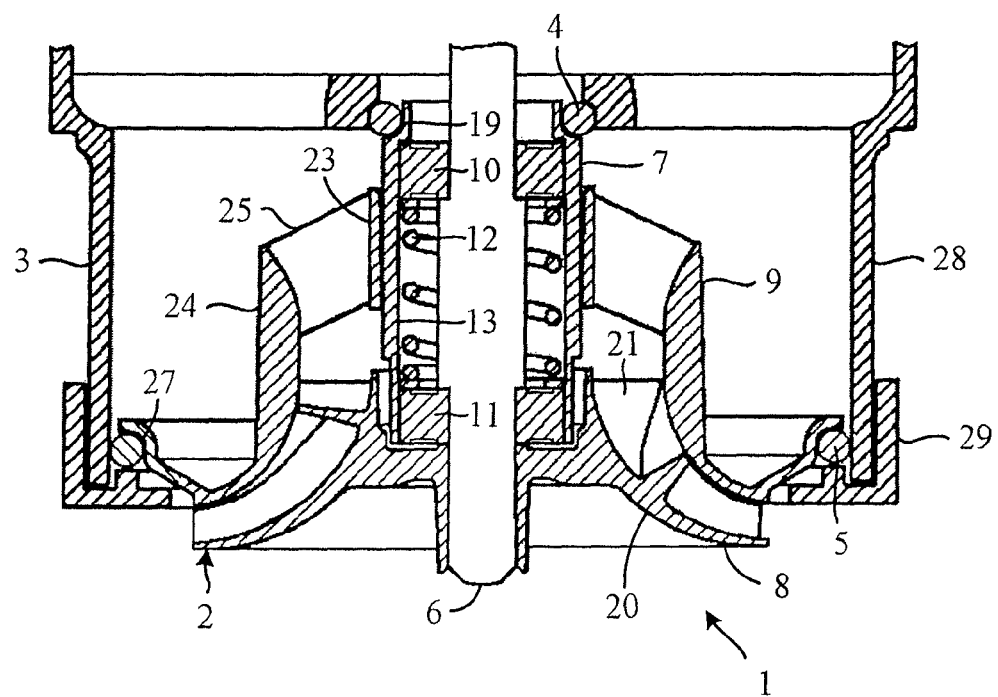
FIG. 1 is a sectional view of a turbomachine in accordance with the present invention.
Figure 3:
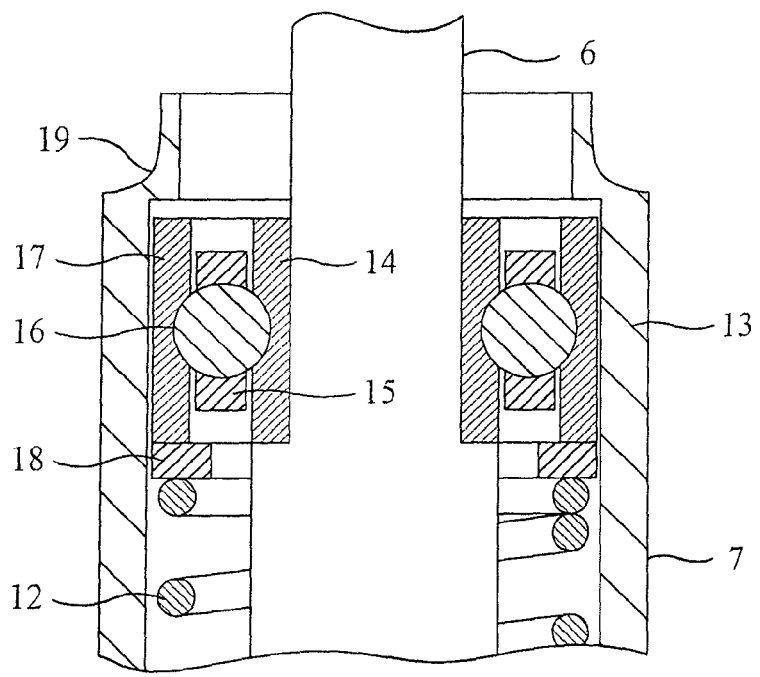
FIG. 3 is an expanded view of one end of the bearing assembly of the turbomachine.
Figure 2:
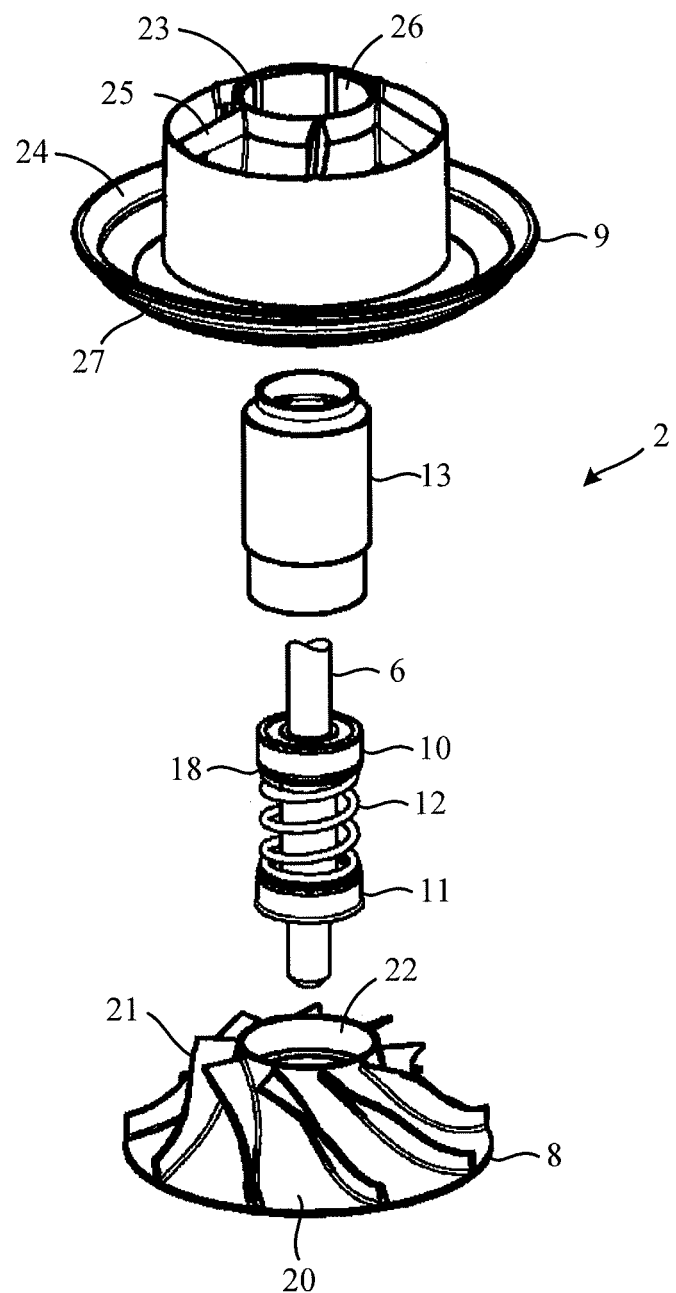
FIG. 2 is an exploded view of the rotor assembly of the turbomachine.

The turbomachine 1 of FIGS. 1 to 3 comprises a rotor assembly 2 mounted to a frame 3 by a pair of o-rings 4,5.

The rotor assembly 2 comprises a shaft 6, a bearing assembly 7, an impeller 8 and a shroud 9. The bearing assembly 7 and the impeller 8 are mounted to the shaft 6, and the shroud 9 is mounted to the bearing assembly 7 so as to cover the impeller 8.

The bearing assembly 7 comprises a first bearing 10, a second bearing 11, a spring 12, and a sleeve 13.

Each of the bearings 10,11 comprises an inner race 14, a cage 15 supporting a plurality of balls 16, and an outer race 17. The bearings 10,11 are mounted to the shaft 6 on opposite sides of a stepped section. The inner race 14 of each bearing 10,11 abuts the stepped section, which serves to space the two bearings 10,11 by a predetermined length.

The spring 12 surrounds the stepped section of the shaft 6 and applies an axial force to the outer races 17 of the two bearings 10,11. Owing to the relative sizes of the spring 12 and the outer races 17, a washer 18 is provided between the spring 12 and each outer race 17. Since the stepped section has a predetermined length and the spring 12 has a predetermined spring constant, each of the bearings 10,11 is preloaded with the same predetermined force.

The sleeve 13 surrounds the bearings 10,11 and the spring 12. The sleeve 13 forms a clearance fit with the outer race 17 of the first bearing 10, and is secured to the outer race 17 of the second bearing 11 by an adhesive. A layer of grease or other lubricant may be provided between the outer race 17 of the first bearing 10 and the sleeve 13. The sleeve 13 comprises an end portion that extends axially beyond the first bearing 10. The end portion has a step down in outer diameter that defines a seat 19 for one of the o-rings 4.

The impeller 8 is a semi-open centrifugal impeller that comprises a base 20 and a plurality of blades 21. The base 20 has an aerodynamic upper surface around which the blades 21 are supported, and a central bore 22 through which the shaft 6 is received. The shaft 6 is secured within the bore 22 by interference fit and/or an adhesive join.

The shroud 9 comprises a hub 23, a hood 24 and a plurality of spokes 25 that extend radially between the hub 23 and the hood 24. The hub 23 is cylindrical and includes a central bore 26. The hood 24 is axially longer than the hub 23 and the spokes 25 extend between the hub 23 and an upper part of the hood 24. The inner surface of the hood 24 has an aerodynamic profile that corresponds to the edges of the blades 21 of the impeller 8. The outer perimeter of the hood 24 is shaped so as to define an annular seat 27 for the other of the o-rings 5.

The shroud 9 is secured to the bearing assembly 7 such that the shroud 9 covers the impeller 8. More particularly, the bearing assembly 7 extends through the bore 26 in the hub 23 and is secured by an adhesive.

The rotor assembly 2 is mounted to the frame 3 at both the bearing assembly 7 and at the shroud 9. More particularly, the rotor assembly 3 is soft mounted at each location by one of the o-rings 4,5. A first o-ring 4 is located in the seat 19 of the bearing assembly 7, and a second o-ring 5 is located in the seat 27 of the shroud 9.

Mounting the rotor assembly 2 to the frame 3 at two locations that are spaced axially provides good stability. In soft-mounting the rotor assembly 2 to the frame 3, less of the vibration of the rotor assembly 2 is translated to the frame 3. Additionally, there is reduced loading of the bearing assembly 7 and the first flexural frequency of the rotor assembly 2 is increased.

By providing an o-ring seat 19 at an end of the bearing assembly 7, mounting the rotor assembly 2 within the frame 3 is made relatively easy. In particular, the rotor assembly 2 can be inserted into an upper part 28 of the frame 3. A lower part 29 of the frame 3 can then be secured to the upper part 28 so as to enclose and hold the rotor assembly 2. In contrast, a conventional rotor assembly might include an o-ring seated in a groove formed around the bearing assembly. However, since the o-ring is made of an incompressible material, it is generally difficult to mount the rotor assembly within the frame.

Providing an o-ring seat 19 at an end of the bearing assembly 7 has the further advantage that axial forces may be better opposed. In particular, the surfaces of the frame 3 and the o-ring seat 19 of the bearing assembly 7 may extend around the first o-ring 4 such that axial displacement of the rotor assembly 2 acts to compress the o-ring 4. In contrast, with a conventional rotor assembly in which an o-ring is seated in a groove about the bearing assembly, the surface of the frame is likely to be flat and thus offer poor opposition to axial loading. A further groove might be provided in the frame so as to better oppose axial loading. However, having grooves in both the frame and the bearing assembly further increases the difficulty in mounting the rotor assembly.

The provision of a bearing assembly 7 that comprises spaced bearings 10,11 surrounded by a sleeve 13 increases the stiffness of the rotor assembly 2. This in turn increases the frequency of the first flexural mode and thus the critical speed of the rotor assembly 2. Since the bearings 10,11 are spaced by a predetermined distance and the spring 12 has a predetermined spring constant, the bearings 10,11 are preloaded with the same, well-defined force. The magnitude of the preload may therefore be defined so as to prevent skidding of the bearings 10,11 without the preload being excessive, which would otherwise result in poor bearing performance.

During operation of the turbomachine 1, the impeller 8 generates an axial thrust in a direction from the second bearing 11 to the first bearing 10, i.e. in an upwards direction as viewed in FIG. 1. As a consequence of the axial thrust, the shaft 6 and thus the inner races 14 of the bearings 10,11, which are press fit onto the shaft 6, are displaced in an upwards direction. Although the displacement is relatively small, any displacement of the inner races 14 relative to the outer races 17 will affect the preload of the bearings 10,11.

As the inner races 14 are displaced upwards, the preload of the first bearing 10 decreases and the preload of the second bearing 11 increases. If the outer race 17 of the first bearing 10 were fixed to the sleeve 13 (i.e. if the outer race 17 was incapable of moving relative to the sleeve 13), the resulting reduction in preload may cause the balls 16 of the first bearing 10 to skid, thereby reducing the lifespan of the bearing 10. It is for this reason that the outer race 17 of the first bearing 10 forms a clearance fit with the sleeve 13. By establishing a clearance between the two components, the outer race 17 of the first bearing 10 is free to move relative to the sleeve 13. Consequently, as the inner race 14 of the first bearing 10 is displaced upwards and the preload of the first bearing 10 decreases, the spring 12 displaces the outer race 17 upward so as to restore the preload. Accordingly, in spite of the axial thrust generated by the impeller 8, the preload of the first bearing 10 is unchanged.

The second bearing 11 is responsible for transferring the axial thrust from the shaft 6 to the sleeve 13 and o-ring 4.

Consequently, an increase in the preload of the second bearing 11 is unavoidable. The increase in preload may reduce the lifespan of the second bearing 11. However, any reduction in the lifespan of the second bearing 11 will be far smaller than the reduction in the lifespan of the first bearing 10, if the preload of the first bearing 10 were to decrease. The increase in the preload of the second bearing 11 is therefore the price that is paid for ensuring that the preload of the first bearing 10 is maintained.

Referring now to FIG. 3, the end portion of the sleeve 13 (i.e. that portion that extends axially beyond the first bearing 10) includes a step down in both the inner diameter and the outer diameter. The step down in the outer diameter defines the o-ring seat 19. The o-ring seat 19 may be formed purely by a step down in the outer diameter. However, this would then require a much thicker sleeve 13. By including a step down in the inner diameter, the o-ring seat 19 may be formed using a thinner sleeve. Additionally, the bearing assembly may be mounted to the frame in more radially compact manner. If the outer race 17 of the first bearing 10 were to abut the step in the inner diameter of the sleeve 13, the outer race 17 would be prevented from moving axially relative to the sleeve 13 and thus it would not be possible to the maintain the preload of the first bearing 10. Accordingly, the step in the inner diameter of the sleeve 13 is spaced axially from the first bearing 10. The end portion of the sleeve 13 may therefore be said to comprise a first portion proximal to the first bearing 10 and a second portion distal to the first bearing 10. The inner diameter of the first portion is greater than the outer diameter of the first bearing 10, and the inner diameter of the second portion is smaller than the outer diameter of the first bearing 10. The first portion therefore acts to space axially the step in the inner diameter of the sleeve 13 from the first bearing 10. Consequently, the outer race 17 of the first bearing 10 is free to move axially relative to the sleeve 13 in response to the axial thrust generated by the impeller 8.

In the embodiment described above, a clearance fit is established between the outer race 17 of the first bearing 10 and the sleeve 13. Grease or another viscous lubricant may be provided in the clearance so as to minimise any friction between the outer race 17 and the sleeve 13, which might otherwise influence the preload of the bearing 10. In an alternative embodiment, the outer race 17 of the first bearing 10 may be adhered to sleeve 13. The adhesive has an elasticity that permits the outer race 17 to be displaced by the spring 12 relative to the sleeve 13 in response to the axial thrust generated by the impeller 8. As already noted, the displacement of the inner race 14 is relatively small. Accordingly, the outer race 17 may be displaced by an equivalent amount so as to maintain the preload without failure of the adhesive.

The sleeve 13 is secured to the second bearing 11 by an adhesive. Alternatively, the sleeve 13 might be press fit onto the second bearing 11. However, since the first bearing 10 and the second bearing 11 have the same outer diameter, the use of an adhesive simplifies the manufacture of the rotor assembly 2.

The invention claimed is:

1. A bearing assembly comprising a first bearing, a second bearing, a spring applying a preload to each of the bearings, and a sleeve surrounding the spring and the bearings, wherein the sleeve comprises an end portion that extends axially beyond the first bearing and away from the second bearing, the end portion comprising a step down in outer diameter that defines a seat for an o-ring.

2. The bearing assembly as claimed in claim 1, wherein the sleeve is adhered to or forms a clearance fit with the first bearing.

3. The bearing assembly as claimed in claim 1, wherein the end portion comprising a step down in inner diameter that is spaced axially from the first bearing.

4. The bearing assembly as claimed in claim 1, wherein the end portion comprises a first portion proximal to the first bearing and a second portion distal to the first bearing, the first portion has an inner diameter greater than the outer diameter of the first bearing, and the second portion has an inner diameter less than the outer diameter of the first bearing.

5. The bearing assembly as claimed in claim 1, wherein the sleeve is adhered to the second bearing.

6. A rotor assembly comprising a shaft and a bearing assembly, wherein the bearing assembly comprises a first bearing, a second bearing, a spring and a sleeve, the spring applies a preload to each of the bearings, the sleeve surrounds the spring and the bearings, the sleeve comprises an end portion that extends axially beyond the first bearing and away from the second bearing, the end portion comprising a step down in outer diameter that defines a seat for an o-ring, and the shaft forms an interference fit with each of the bearings.

7. The rotor assembly as claimed in claim 6, wherein the sleeve is adhered to or forms a clearance fit with the first bearing.

8. The rotor assembly as claimed in claim 6, wherein the end portion comprising a step down in inner diameter that is spaced axially from the first bearing.

9. The rotor assembly as claimed in claim 6, wherein the end portion comprises a first portion proximal to the first bearing and a second portion distal to the first bearing, the first portion has an inner diameter greater than the outer diameter of the first bearing, and the second portion has an inner diameter less than the outer diameter of the first bearing.

10. The rotor assembly as claimed in claim 6, wherein the sleeve is adhered to the second bearing.

11. The rotor assembly as claimed in claim 6, wherein the rotor assembly comprises an impeller mounted to the shaft, the impeller generating in use an axial thrust in a direction from the second bearing to the first bearing.

12. The rotor assembly as claimed in claim 6, wherein the shaft comprises a stepped section and each of the bearings abuts the stepped section such that the bearings are spaced by a predetermined distance.

13. A turbomachine comprising a frame and a rotor assembly, wherein the rotor assembly comprises a shaft and a bearing assembly, the bearing assembly is mounted to the shaft and comprises a first bearing, a second bearing, a spring and a sleeve, the spring applies a preload to each of the bearings, the sleeve surrounds the spring and the bearings, the sleeve comprises an end portion that extends axially beyond the first bearing and away from the second bearing, the end portion comprising a step down in outer diameter that defines a seat for an o-ring, and the rotor assembly is mounted to the frame by an o-ring located in the seat of the sleeve.

14. The turbomachine as claimed in claim 13, wherein the rotor assembly comprises an impeller mounted to the shaft, the impeller generating in use an axial thrust in a direction from the second bearing to the first bearing, and the first bearing moves relative to the sleeve in response to the axial thrust.

* * * * *